(12) United States Patent
Yalniz et al.

(10) Patent No.: US 9,390,315 B1
(45) Date of Patent: Jul. 12, 2016

(54) IMAGE MATCH FOR FEATURELESS OBJECTS

(71) Applicant: A9.com, Inc., Palo Alto, CA (US)

(72) Inventors: Ismet Zeki Yalniz, Mountain View, CA (US); Colin Jon Taylor, Orinda, CA (US); Mehmet Nejat Tek, Santa Clara, CA (US); Shanghsuan Tsai, Sunnyvale, CA (US)

(73) Assignee: A9.com, Inc., Palo Alto, CA (US)

( * ) Notice: Subject to any disclaimer, the term of this patent is extended or adjusted under 35 U.S.C. 154(b) by 0 days.

(21) Appl. No.: 14/750,855

(22) Filed: Jun. 25, 2015

(51) Int. Cl.
*G06K 9/46* (2006.01)
*G06K 9/00* (2006.01)
*G06T 7/40* (2006.01)
*G06T 7/60* (2006.01)
*G06T 7/00* (2006.01)

(52) U.S. Cl.
CPC .......... *G06K 9/00208* (2013.01); *G06T 7/0042* (2013.01); *G06T 7/408* (2013.01); *G06T 7/60* (2013.01); *G06T 2207/10004* (2013.01)

(58) Field of Classification Search
None
See application file for complete search history.

(56) References Cited

U.S. PATENT DOCUMENTS 4,232,334 A * 11/1980 Dyson ................ G09B 19/0076
345/440

* cited by examiner

*Primary Examiner* — Chan Park
*Assistant Examiner* — Elisa Rice
(74) *Attorney, Agent, or Firm* — Hogan Lovells US LLP

(57) ABSTRACT

Object identification through image matching can utilize ratio and other data to accurately identify objects having relatively few feature points otherwise useful for identifying objects. An initial image analysis attempts to locate a "scalar" in the image, such as may include a label, text, icon, or other identifier that can help to narrow a classification of the search, as well as to provide a frame of reference for relative measurements obtained from the image. By comparing the ratios of dimensions of the scalar with other dimensions of the object, it is possible to discriminate between objects containing that scalar in a way that is relatively robust to changes in viewpoint. A ratio signature can be generated for an object for use in matching, while in other embodiments a classification can identify priority ratios that can be used to more accurately identify objects in that classification.

20 Claims, 8 Drawing Sheets

IMAGE MATCH FOR FEATURELESS OBJECTS

BACKGROUND

Users are increasingly utilizing electronic devices to obtain various types of information. For example, a user wanting to obtain information about an object of interest can capture an image of the object and request or cause that image to be analyzed to attempt to locate information for a matching object. An image analysis and matching process typically looks for features of an object represented in an image and performs a matching process whereby an attempt is made to locate an object with features that are determined to sufficiently match those of the captured image. It can be difficult to obtain accurate results, however, for objects that have a relatively low number of features that enable those objects to be accurately identified. Further, there can be various objects that are relatively similar such that even if the type of object can be identified, it can be difficult to determine the correct version, size, or model.

BRIEF DESCRIPTION OF THE DRAWINGS

Various embodiments in accordance with the present disclosure will be described with reference to the drawings, in which.

DETAILED DESCRIPTION

Figure 1A:
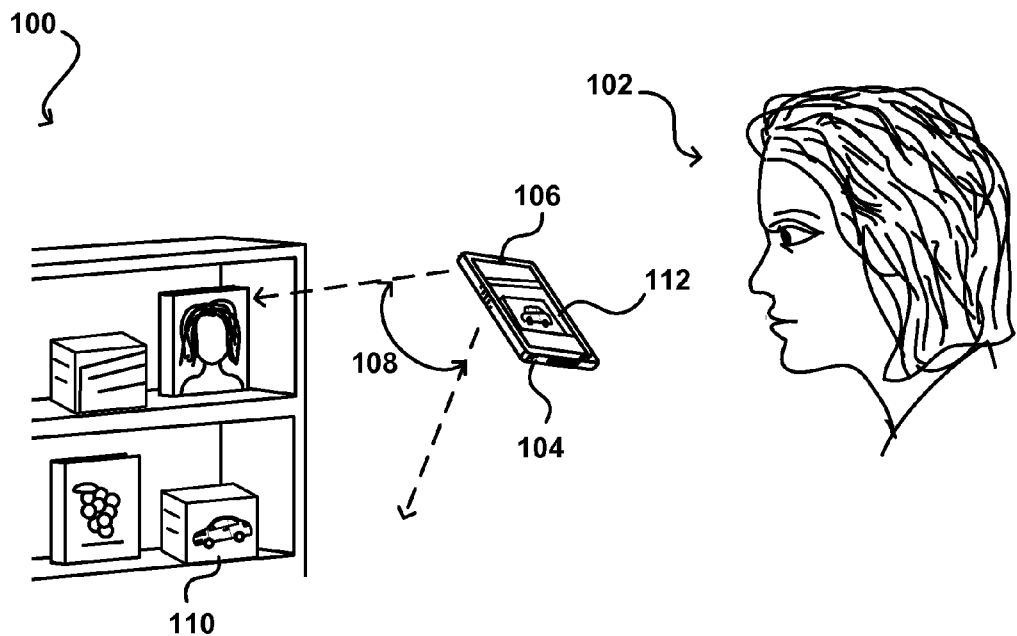
FIGS. 1A and 1B illustrates an example environment for obtaining information about an object that can be utilized in accordance with various embodiments.

Systems and methods in accordance with various embodiments of the present disclosure can overcome one or more of the above-referenced and other deficiencies in conventional approaches to identifying various types of objects using an electronic device. In particular, various embodiments utilize data such as measurement, ratio, and color consistency data to attempt to improve recognition and identification of "featureless" object(s) represented in images, where those objects may not have enough recognizable features (from at least an image recognition standpoint) to be accurately recognized using an object recognition, feature matching, or other such algorithm. In at least some embodiments, a user can capture an image (or video) of an object using a camera of a portable computing device. The user can upload the image to a matching service configured to identify the object, and provide the user with information about that object, such as a description, pricing and availability, and other such information. In some instances, the image the user provides can be pre-processed on the computing device such that only certain data is uploaded for matching.

In at least some embodiments, a user will request or cause an image to be captured that includes a representation of an object of interest, such as a product to be identified. This image can be captured by the user positioning a camera of a computing device such that the object is within a field of view of the camera, and then providing input to cause the image to be captured. In order to identify the object, a feature detection process or other such process can attempt to determine salient points or feature points in the image, such as may correspond to corners and edges in the image. These features, and their relative locations, can be compared against a data store (or other collection) of images and/or image data to attempt to find data for an object that "matches" the object of interest represented in the image. A "match" can correspond to sets of feature points that are determined to correspond, in number and relative position, between an image of an object of interest, or query image, and a stored image of an object, or matching image, within a specified threshold or level of similarly, etc. In some instances, the number of feature points identified can be insufficient to identify the object or find a match with a minimum level of confidence or certainty. For example, images of objects such as shirts and couches may not have enough features to identify them using conventional processing.

Since some objects will not have a sufficient set of feature points to enable accurate recognition or identification, approaches in accordance with various embodiments can take advantage of the fact that such "featureless" objects typically possess characteristics in different forms, even though they lack discriminative image features. Such intrinsic characteristics can include certain measurements and their ratios, as well as color consistencies in specific regions of the objects, etc. For example, certain models or brands might have different aspect ratios or dimensions, might have differently sized logos or text, might have different relative placements or sizes of elements of the object, etc. By analyzing the ratios of an object in an image, in particular with respect to the recognized "scalar" elements such as logos or labels, a determination can be made as to which model, version, or specific object is represented. The presence of the scalar element, if identified, can help to narrow the search space by identifying a category or classification of objects against which to match the ratio data, such as all objects known to include that particular logo, etc. The classification in some embodiments can help to identify important ratios to examine, or at least weightings to apply to different ratios. In other embodiments, a ratio signature can be generated by sampling several different ratios and aggregating those into a range, average, histogram, or other such measure, and then comparing that against signatures in the classification. Various other measures can assist as well, such as to compare color regions or other aspects for consistency, as two objects might be of similar shape other than certain regions of color, such that the color analysis can help to identify the precise object being identified.

Various other functions and advantages are described and suggested below as may be provided in accordance with the various embodiments.

FIG. 1 illustrates an example environment 100 in which aspects of the various embodiments can be implemented. In this example, a user 102 is in a store that sells items, such as books, toys, and the like, and is interested in obtaining information about an object 110 of interest. In this example, the object 110 is a model car kit, still in the box. Using an appropriate application executing on a computing device 104, the user is able to obtain an image of the object 110 by positioning the computing device such that the object is within a field of view 108 of at least one camera 106 of the computing device. Although a portable computing device (e.g., an electronic book reader, smart phone, or tablet computer) is shown, it should be understood that any electronic device capable of receiving, determining, and/or processing input can be used in accordance with various embodiments discussed herein, where the devices can include, for example, desktop computers, notebook computers, personal data assistants, video gaming consoles, television set top boxes, and portable media players, among other such devices.

In this example, a camera 106 on the device 104 captures image information (e.g., still or video) including the object 110 of interest, and at least a portion of the image is displayed on a display screen 112 of the computing device. At least a portion of the image information can be analyzed and, upon a match being located, identifying information can be displayed back to the user via the display screen 112 of the computing device 104. The portion of the image to be analyzed can be indicated manually, such as by a user pointing to the object on the screen, drawing a bounding box around the object, or centering the object in the field of view. In other embodiments, one or more image analysis algorithms can attempt to locate one or more objects in an image to be analyzed. In some embodiments, a user can manually request or cause image information to be analyzed, while in other embodiments the image information can be analyzed automatically, either on the device or by streaming scene data to a remote system or service as discussed later herein.

Figure 1B:
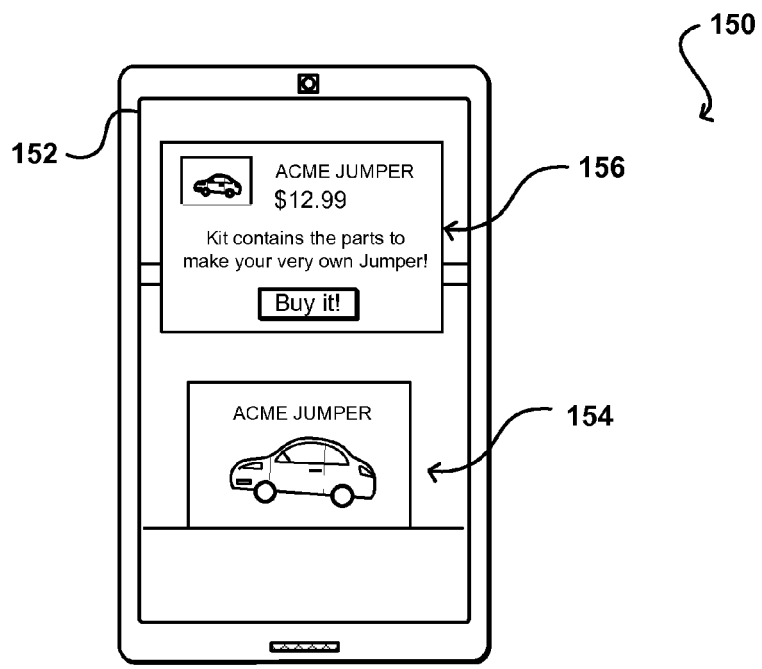

FIG. 1B illustrates an example of a type of information 156 that could be displayed to the user via a display screen 152 of a computing device in accordance with various embodiments. In this example, captured image information (e.g., video) is displayed on the display screen 152. In at least some embodiments video can be shown on the display screen in near real time, including after one or more frames or portions of that video has been provided or selected for analysis. In addition to the image or video information, related information 156 that has been located for the object 154 can be displayed as well. The related information in this example includes an image of the identified object, such that the user can verify the identified object corresponds to the object of interest. The related information in this example also includes a title or name of the object (or type of object), pricing information, a description, and an option to purchase at least one of that type of object. It should be understood that while various examples discussed herein relate to products offered for consumption (e.g., purchase, rent, or lease), various other types of objects and information can be utilized as well within the scope of the various embodiments.

The "related" information as discussed elsewhere herein can include any information related to an object, item, product, or other element that is matched (within at least a level of confidence) to the image data using one or more matching or identifying algorithms, or other such approaches. These can include, for example, image recognition algorithms, feature recognition algorithms, facial recognition algorithms, audio pattern recognition algorithms, or any other such approaches or techniques. In some embodiments, the type of information displayed (or otherwise conveyed) can depend at least in part upon the type of object located or matched. For example, a located product might include pricing and availability information, while a located place might contain address data. For facial recognition, the information might include name, title, and contact information. Various other types of information can be displayed as well within the scope of the various embodiments.

In the example situation 100 of FIG. 1A the object 110 represented in the captured image has many features that enable it to be accurately matched against a product image database. As can be determined from the image of the object 154 illustrated in FIG. 1B, there can be many feature points or other points, features, or relationships enabling the object to be successfully mapped against a database of images or image data. For example, the packaging includes a name of the object and a picture of the object contained within the packaging. In this case, the model car has many features enabling it to be matched against images of that type of car, with the wording on the box enabling the object to be identified. The packaging might even include words such as "model kit" or a serial number or bar code that enable this object to be accurately identified using a process such as feature detection and image matching.

Figure 2A:
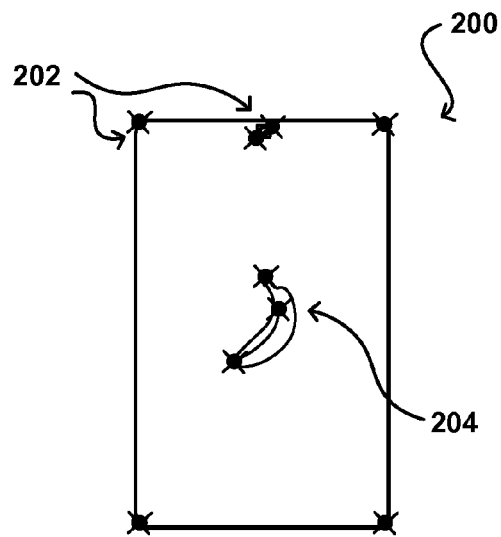
FIGS. 2A, 2B, 2C, and 2D illustrate example object representations that may contain a relatively small number of feature points that can be processed in accordance with various embodiments.

It might be the case, however, that there may not be a sufficient number of features to adequately identify an object. In an extreme example, a white cue ball might have no features or points usable for conventional image matching or feature analysis. There might be some instances where an object might have a small number of feature points, or at least a number of feature points that is insufficient to adequately identify the object with at least a minimum amount of certainty or confidence, etc. FIG. 2A illustrates one example device 200 that can be identified using approaches in accordance with the various embodiments. In this example, the device is a portable electronic device, such as a smartphone, tablet computer, portable media player, or other such device. The device casing in this example is a single color, such as white or black, with rounded corners such that there are very few conventional points or features 202 to be used for identifying the object. A logo 204 is present on the device, which can include a sufficient number of features 202 identified from a captured image to accurately identify the logo. Unfortunately, if the logo 204 is present on similar cases for the tablets, media players, smartphones, and other such devices, the identification process might only be able to, at best, match the image to image data for a set of products containing that logo on a similar case. Further, the logo and few feature points can be insufficient to identify versions of a type of device, even if the versions had different dimensions or other such aspects.

Figure 2B:
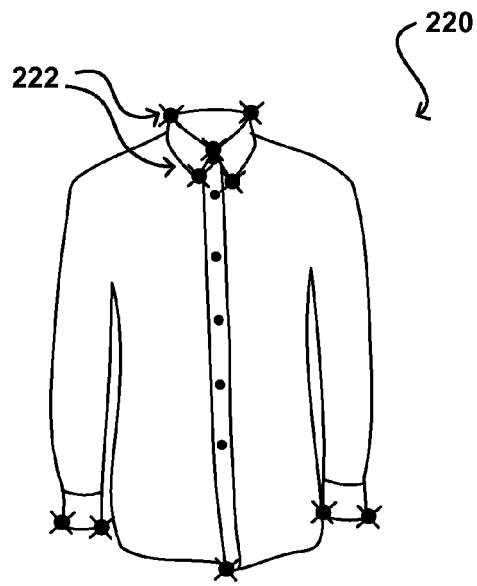

The problem can be exacerbated for objects such as apparel items and other items that are deformable and can have different shapes represented in different images based on who is wearing the item, how the item is displayed, etc. FIG. 2B illustrates an example object 220, in this case a shirt, which can have relatively few feature points determinable for purposes of identifying the shirt. For example, the shirt might be a plain white shirt with no recognizable pattern, such that the feature points 222 might only be determinable for the collar, sleeves, buttons, or other such features which might be sufficient to identify the object as a shirt, or even a white shirt, but may not be sufficient to narrow down which type or brand of shirt is represented, as well as other aspects such as the size or style. Even if there is a pattern, the deformability of the cloth of the shirt can make it difficult to identify the object with a sufficient or minimum level of confidence.

Figure 2C:
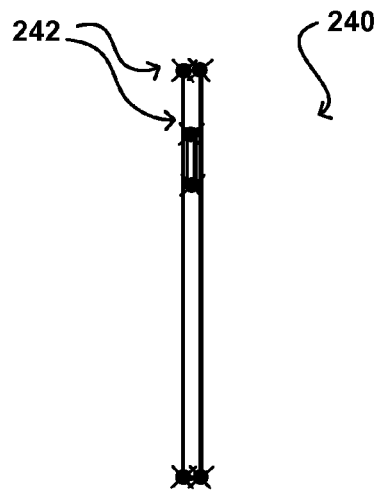
Figure 2D:
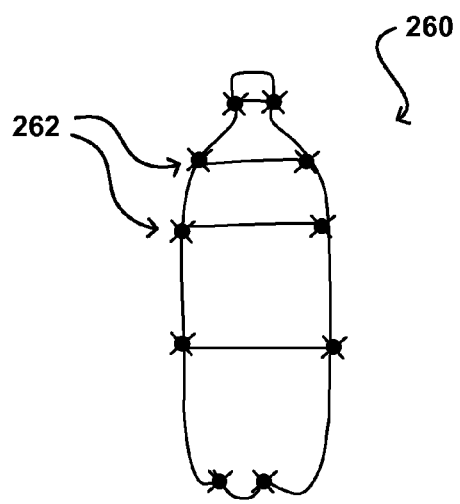

FIGS. 2C and 2D illustrate other example items 240, 260 that can have relatively few feature points detectable for identification or other such purposes. In FIG. 2C a side-view of an electronic device 240 is illustrated, where there are few feature points usable to identify the type of device, as well as the model or brand as discussed elsewhere herein. Similarly, in FIG. 2D the object is a soda bottle 260 that may have relatively few feature points 262 useful for identifying the size or brand of the bottle. Even if a logo is visible on the bottle, the problem can be similar to that discussed with respect to FIG. 2A, in that it may be possible to identify the group of bottle types having that logo but difficult to identify the exact type of bottle, such as whether the bottle is a two liter bottle or a sixteen ounce bottle of that particular brand of soda, among other such options.

Accordingly, approaches in accordance with various embodiments attempt to use detectable aspects such as distance ratios to attempt to recognize and/or identify one or more objects represented in a captured image, set of images, or video, etc. In accordance with some embodiments, an attempt can be made to identify or recognize at least one portion of the image that can be used as a scalar element, or reference distance or size, that can be used as a reference for purposes of determining size (or relative size) in an image captured by a monocular (or other) camera (or set of cameras). Based at least in part upon the scalar element, an attempt can be made to identify a class, set, or group of objects that correspond to the scalar element. This can include, for example, products that contain a recognized logo. Such an approach can be utilized to reduce the search space, thus reducing the amount of time and resources needed for the match or identification process. Further, using the scalar element a set of ratios can be determined that can be used to identify the object. A ratio can include, for example, the distance between two features of the scalar element with respect to the distance between two feature points of the overall object. In other embodiments, an overall pattern of ratios between feature distances can be used to attempt to recognize an object. For example, a set of feature points can be identified using a specified algorithm, such that similar feature points should be identified for various images of that object if processed using that algorithm. The ratios of differences between points thus should be similar for each image. A histogram, distribution, or other set of ratio data then can be analyzed to attempt to identify the object by matching the histogram with ratio histogram data for a corresponding object.

Figure 3A:
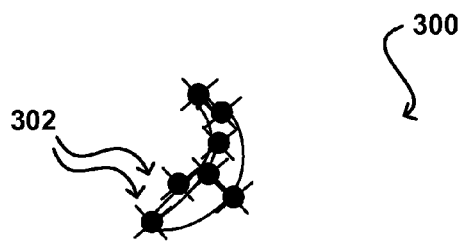
FIGS. 3A, 3B, and 3C illustrate an example approach for identifying an object based at least in part upon ratio data that can be utilized in accordance with various embodiments.
Figure 3B:
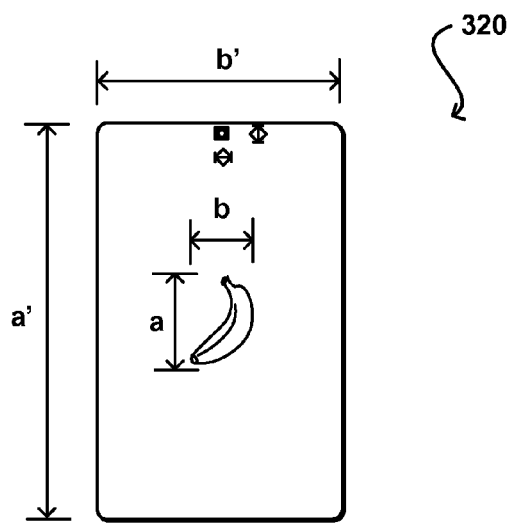
Figure 3C:
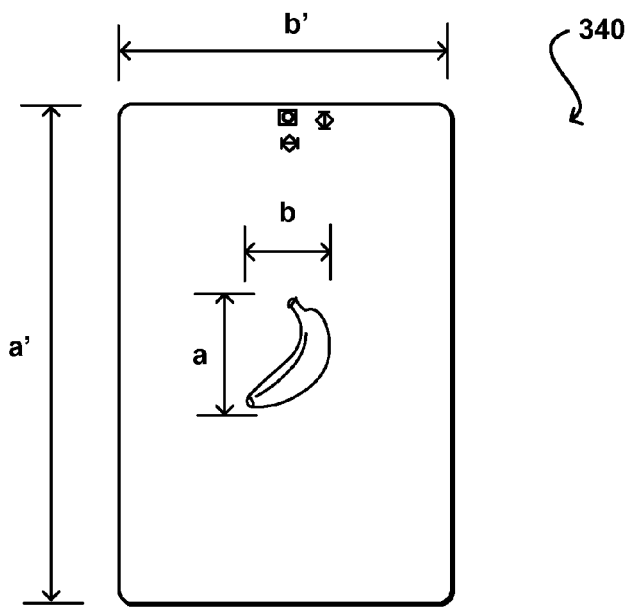

An example of utilizing such a process to identify objects is presented with respect to FIGS. 3A-3C. In this example two images are captured, with each image including a representation of a respective computing device with a similar logo. For each image, feature points 302 can be identified (or another process used) to identify the logo 300 present on each device, as illustrated in FIG. 3A. In some embodiments a logo match process might be used, among other such options. The recognition of the logo can enable a number of different processes to be performed. For example, the recognition of a logo on the object can enable an identification process to identify a set of candidate objects for matching. In the case of a specific logo, information for that logo might be used to identify the set of objects, for which matching information is available, that correspond to that logo or otherwise have that logo visible somewhere on the object.

As mentioned, there might be multiple types and/or versions of objects that might include such a logo. For example, the device 320 of FIG. 3B might correspond to a smartphone while the device 340 of FIG. 3C might correspond to a tablet computer or a different version of the smartphone. For most products, the size of the logo will not be directly proportional to the size of the device, such that the width of the logo is not always the same percentage of the width of the device, and that the height of the logo is not always the same percentage of the height of the device, etc. Unless all products have the same aspect ratio, such requirements would result in logos that are stretched differently between different devices, which is typically not the case. Thus, by examining specific ratios for certain types of devices the ratios can assist with identification of at least the type of product. For example, compare the heights (a, a') and widths (b and b') between FIGS. 3B and 3C. As illustrated, the ratios of the heights and widths of the logos with respect to the sides of the device casing are different between the two devices 320, 340. Thus, by recognizing the logo and determining the appropriate ratios, an identification process can identify the type of object without a substantial number of feature points present and/or located. Various other ratios can be analyzed as well, as may relate to the size or location of a camera, a speaker, or a port, as well as the radius of curvature of the device, or other such aspects.

As mentioned, the ability to recognize a logo or other such identifier can enable specific (at least relative) measurement ratios to be determined, such as height and width, maximum and minimum edge distances, and the like. In other embodiments, specific ratios are not used and instead a set of ratios is determined. For example, if the distance from the logo to the edges of the respective device was determined and compared against the dimensions of the logo, the average ratio would be larger for the tablet 340 than for the smartphone 320, and assuming a significant number of data points the average ratio should converge to a specific number for the smartphone and a different number for the tablet. Various other ratios and analyses can be used as well within the scope of the various embodiments.

Figure 4A:
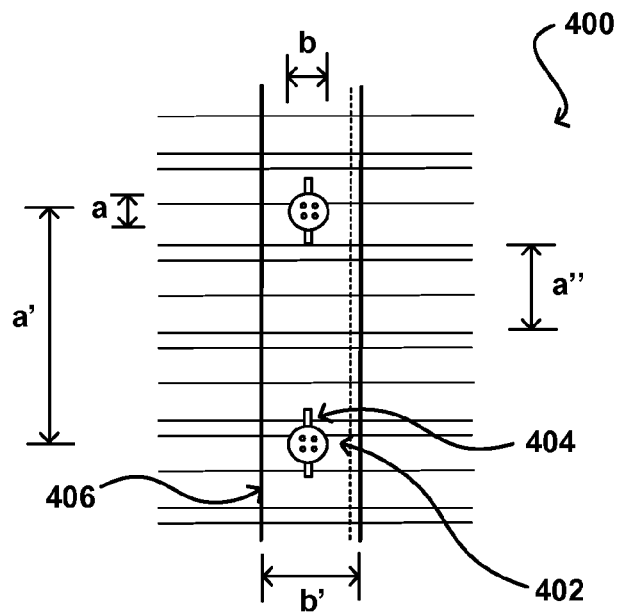
FIGS. 4A, 4B, and 4C illustrate example approaches for identifying objects based at least in part upon ratio data that can be utilized in accordance with various embodiments.

As mentioned, being able to determine something about the object represented in an image can help to narrow the search space and/or determine the most useful ratios to determine and/or compare. For example, in the situation 400 illustrated in FIG. 4A there may be sufficient feature points available in an entire image to determine that the object represented is a shirt, even though the number and arrangement of feature points may provide little other guidance. One may use other techniques to verify that the object is a shirt as well, such as by using CNN classifiers or other machine learning type techniques. By determining that the object is a shirt, however, the recognition process can look for specific features and ratios that can be helpful in identifying the particular shirt. For example, the feature detection process can be used in an information retrieval technique or machine learning technique that can provide prior data about shirts or other objects to indicate that the item generally is a button-down shirt, based upon the relative arrangement of the feature points (or using another such approach). For such a category of objects, there can be specific ratios that are useful in identifying the object. For example, the diameter of the buttons 402 on a specific type of shirt might have a specific ratio with respect to the distance between buttons, the lengths of the button holes 404, the width of the front placket 406, the width of the thread used to make the shirt, and/or other such locations or dimensions. If there is a pattern, the ratio can be between the diameter and/or spacing of the buttons with respect to dimensions of the pattern, or other such aspects. As mentioned previously, the process can look to a specific ratio, specific set of ratios, or sampling of ratios to attempt to match the shirt in the image with image, dimension, and/or ratio data for shirts in a data store or other such location.

Figure 4B:
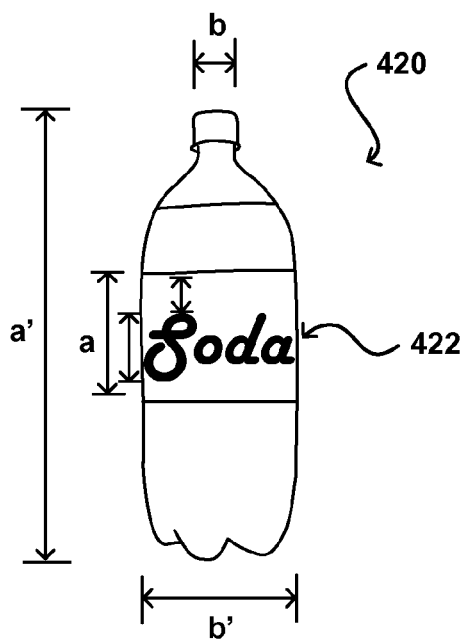

Similarly, in FIG. 4B a soda bottle 420 is illustrated where the general type of object can be determined from feature point extraction, from a machine learning or information retrieval type approach (or another such process), and the brand of object can be determined by recognizing a logo 422 on the bottle. In at least some embodiments, the desired object can be localized before extracting ratios. One may use the estimate of user camera viewpoint and the orientation of the object before extracting the ratios. For example, one can localize the side that is the top to find the ratios concerning the bottle caps, shirt necks etc. Similar approaches can be used for logos of other such elements. Using the logo as a scalar element, particular dimensions can be identified for ratio analysis for differentiating between different types of bottles. Similarly, a sampling of ratios can be performed in order to gather a distribution or average ratio, for example, which can be used to identify the appropriate type of bottle as discussed above. In some instances the bottle shape might vary sufficiently such that the feature point extraction might be able to accurately determine the type of object, while in other instances it may be necessary to look at ratios such as bottle height, cap height, label width, and other such measurements with respect to a dimension of the logo or other such scalar element.

Figure 4C:
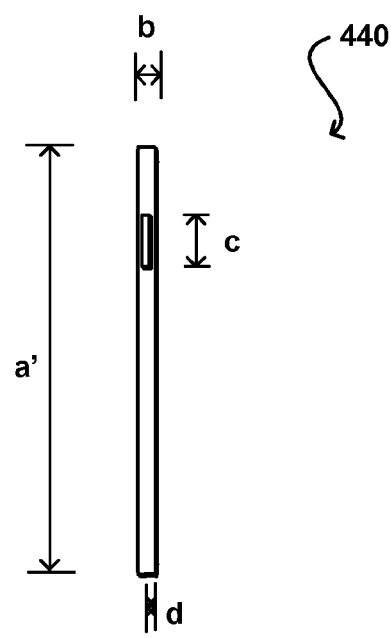

In some embodiments there may be no logo, text, or other identifier visible in the image that can enable a narrowing down of product space and/or ratios to examine. For example, in FIG. 4C the image includes a representation of the side of a smartphone 440, where the only features visible are the shape of the side of the case and the shape, location, and relative size of a button on that side of the device. For such an image, there may be only a few feature points detectable. Thus, there may be only a handful of ratios available. For example, there are ratios between the length and height of the button versus those of the device, length and width of the button versus distance to the respective edge of the device, and so on. Performing a sampling of the ratios may generate a distinct signature, however, as there will be a small set of ratios of very specific values, which can help to compare the image against image data stored for certain items.

Figure 5:
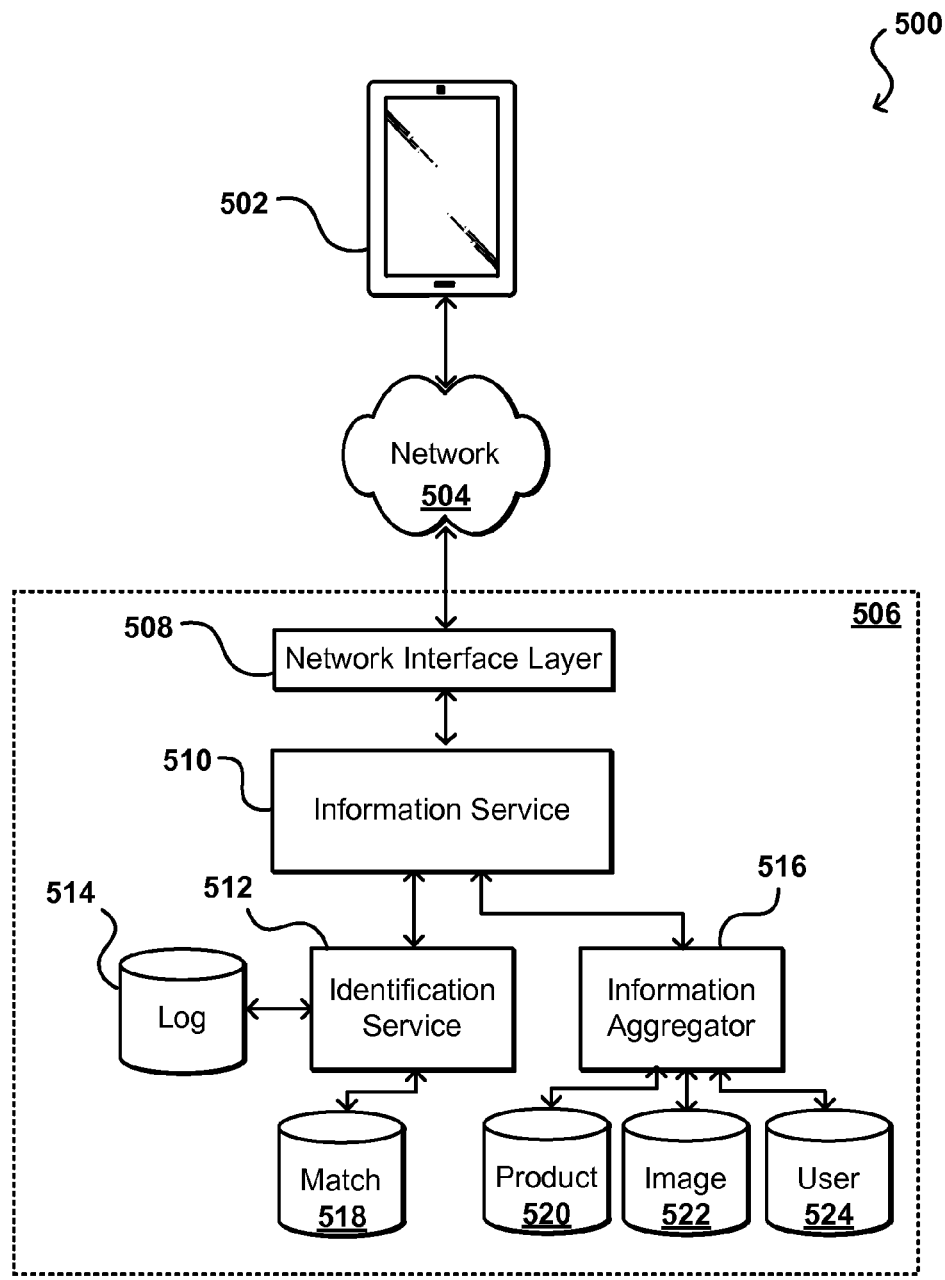
FIG. 5 illustrates an example system for identifying an object that can be presented in accordance with various embodiments.

In at least some embodiments, object identification is performed at least in part by uploading, streaming, or otherwise transferring an image, video segment, and/or other electronic data to a system or service operable to find one or more potential matches for that data and provide related information for those potential matches. In some embodiments, at least a portion of the processing or pre-processing of the data can be performed on the device before transfer, as known in the art for image matching and other such purposes. In still other embodiments, some or all of the matching can be performed on the device itself, among other such options. FIG. 5 illustrates an example environment 500 in which such information can be located and transferred in accordance with various embodiments. In this example, a user is able to capture image information using at least one computing device 502. For example, a user can request or cause a device to capture image and/or video information around the device, and can send at least a portion of that information across at least one appropriate network 504 to attempt to obtain information for one or more objects within a detectable vicinity of the device. In some embodiments, a user can also indicate an image of an object not obtained by the user, or can provide information that can otherwise be used to identify an object. The network 504 can be any appropriate network, such as may include the Internet, a local area network (LAN), a cellular network, and the like. The request can be sent to an appropriate content provider 506, as may provide one or more services, systems, or applications for processing such requests. The information can be sent by streaming or otherwise transmitting data as soon as it is obtained and/or ready for transmission, such as for video data, or can be sent in specific communications.

In this example, a request is received to a network interface layer 508 of the content provider system 506. The network interface layer can include any appropriate components known or used to receive requests from across a network, such as may include one or more application programming interfaces (APIs) or other such interfaces for receiving such requests. The network interface layer 508 might be owned and operated by the provider, or leveraged by the provider as part of a shared resource or "cloud" offering. The network interface layer can receive and analyze the request, and cause at least a portion of the information in the request to be directed to an appropriate system or service, such as an information service 510. An information service in this example includes components operable to receive electronic data about an object, analyze the data using business logic, and return information relating to that object, or related objects. For example, an information service can receive information including one or more images (or portions of an image or image data) of an object near a device, and can cause information to be sent to at least one identification service 512 or system that is operable to attempt to match information for the image data. Various other services, and combinations of services, can be utilized as well within the scope of different embodiments. In at least some embodiments, an identification service 512 will process the received data, such as to extract points of interest, features, and/or ratios of feature distances in a captured image, for example, then compare the processed data against data stored in a matching data store 518 or other such location. The data in the matching data store might be indexed and/or processed to facilitate with matching, as known for such purposes. For example, the data store might include information for features in an image instead of a copy of the image itself, which can increase the speed and lower the processing requirements of the matching. The data store might also include ratio data, ratio signatures, or other such data as discussed herein. This can also include a bank of ratios, for example, where the ratio data can be analyzed over a common denominator for consistency or normalization. The denominator can be any appropriate value, such as a distance between feature points. While there does not have to be one specific denominator, there can be restrictions on the values that can be used as a denominator in at least some embodiments.

The information service 510 can receive information from each contacted identification service 512 as to whether one or more matches could be found, and can receive any appropriate information for a located potential match. The information from each identification service can be analyzed and/or processed by one or more applications of the information service, such as to determine data useful in obtaining information for each of the potential matches to provide to the user. For example, an information service might receive product identifiers or other types of data from the identification service(s) in response to a potential match being detected, and might process that data to be provided to a service such as an information aggregator service 516 that is capable of locating descriptions and/or other content related to the located potential matches.

In at least some embodiments, an information aggregator service might be associated with an entity that provides an electronic marketplace, or otherwise provides items or content for consumption (e.g., purchase, rent, lease, or download)

by various customers. Although products and electronic commerce are presented in this and other examples presented, it should be understood that these are merely examples and that approaches presented in the present disclosure can relate to any appropriate types of elements or information as discussed and suggested elsewhere herein. In such an instance, the information aggregator service 516 can utilize the aggregated data from the information service 510 to attempt to locate products, in a product data store 520 or other such location, which are offered through the marketplace and that match, or are otherwise related to, the matching objects. As an example, if the identification service identifies a puzzle in the captured image or video data, the information aggregator can attempt to determine whether that puzzle is offered through the marketplace, and can obtain data from the marketplace relating to the item. The identification service can also determine whether there are any alternate views of that puzzle stored in an image data store 522, as well as a context of at least some of those views, for presentation to the user. In at least some embodiments, the information aggregator can utilize one or more suggestion algorithms or other such approaches to attempt to suggest related items and/or views to display to the user. For example, if the object is an ingredient a suggestion algorithm might be used to determine dishes or recipes to suggest to the user, as may be based on overall popularity, past user purchases or selections as stored in a user data store 524, or other such information. In some embodiments, the information aggregator can also return other types of data (or metadata) to the information service as well, as may include title information, availability, reviews, and the like. Various other types of information can be returned as well within the scope of the various embodiments.

The information service 510 can bundle at least a portion of the information to send to the client as part of one or more messages or responses to the original request. Information for the matching objects located by the various identification services can be written to a log data store 514 or other such location in order to assist with future matches or suggestions, as well as to help rate a performance of a given identification service. As should be understood, each service can include one or more computing components, such as at least one server, as well as other components known for providing services, as may include one or more APIs, data storage, and other appropriate hardware and software components.

It should be understood that, although the identification services are shown to be part of the provider environment 506 in FIG. 5, one or more of these identification services might be operated by third parties that offer these services to the provider. For example, an electronic retailer might offer an application that can be installed on a computing device for identifying music or movies for purchase. When a user transfers a video clip, for example, the provider could forward this information to a third party who has software that specializes in identifying objects from video clips. The provider could then match the results from the third party with items from the retailer's electronic catalog in order to return the intended results to the user.

Figure 6:
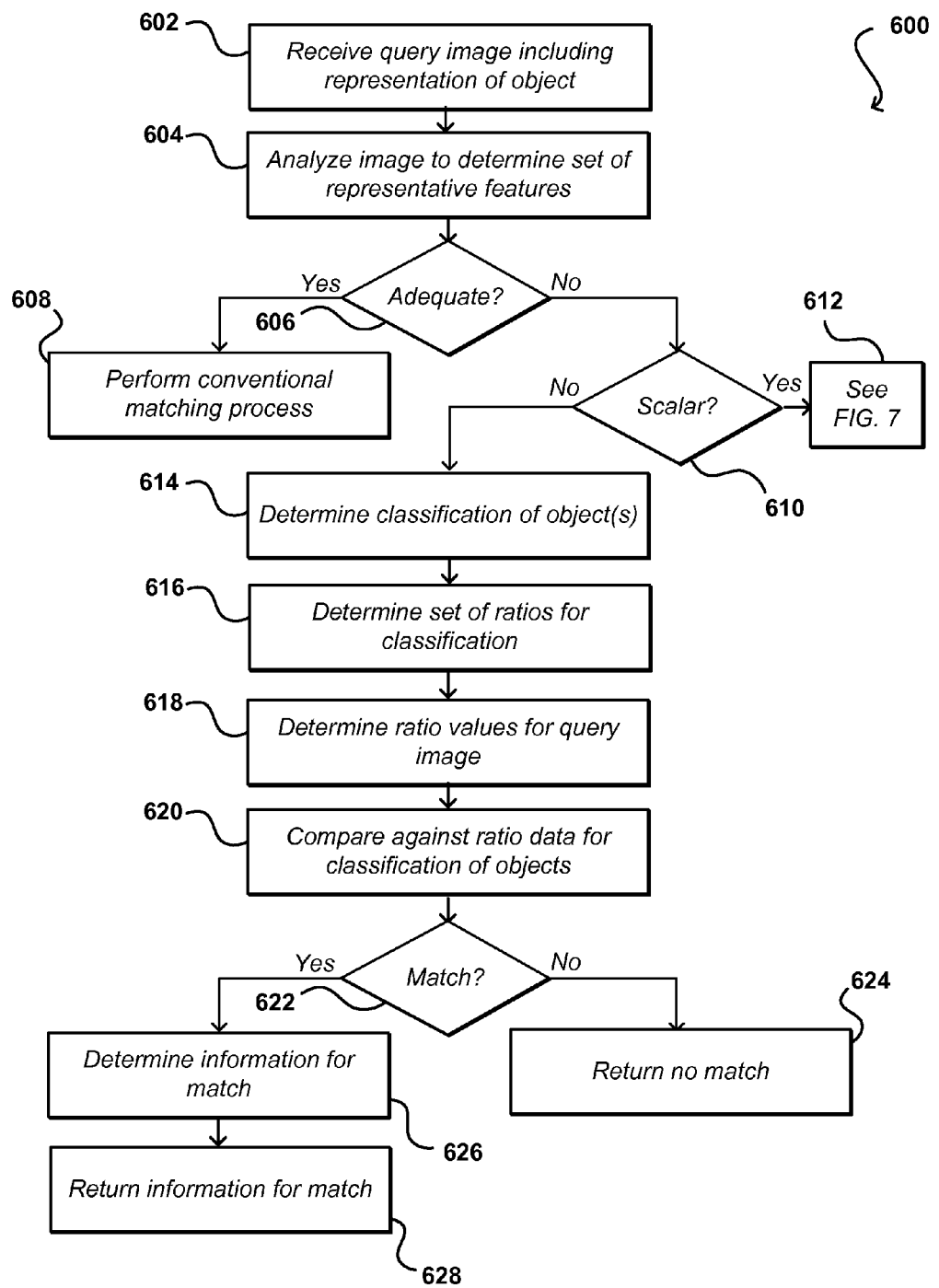
FIG. 6 illustrates a first example process for identifying an object that can be utilized in accordance with various embodiments.

FIG. 6 illustrates an example process 600 for identifying an object that can be utilized in accordance with various embodiments. It should be understood that there can be additional, fewer, or alternative steps performed in similar or alternative orders, or in parallel, within the scope of the various embodiments unless otherwise stated. In this example, a query image is received 602 that includes a representation of at least one object of interest to a user. As mentioned, this can include a single image, series of images, video clip, or other such image data captured with one or more cameras within the scope of the various embodiments. The image data can be accompanied by other data as well, such as sensor data useful in identifying the size of, or distance to, the object. The image can be analyzed 604, on the device or on a system or service remote from the device, using one or more appropriate algorithms to determine a representative set of features from the image. This can include any appropriate feature detection algorithm known or used in the art or subsequently developed for such purposes within the scope of the various embodiments. A determination can be made 606 as to whether the feature points (real or virtual) located in the image are adequate for an image matching process. Virtual feature points can include, for example, the intersection of lines that can be determined to intersect outside the bounds of the image. The determination can include a number of different factors, such as the number of points, distribution of points, percentage of the image in which the features are distributed, and the like. If so, a conventional matching process can be performed 608.

Figure 7:
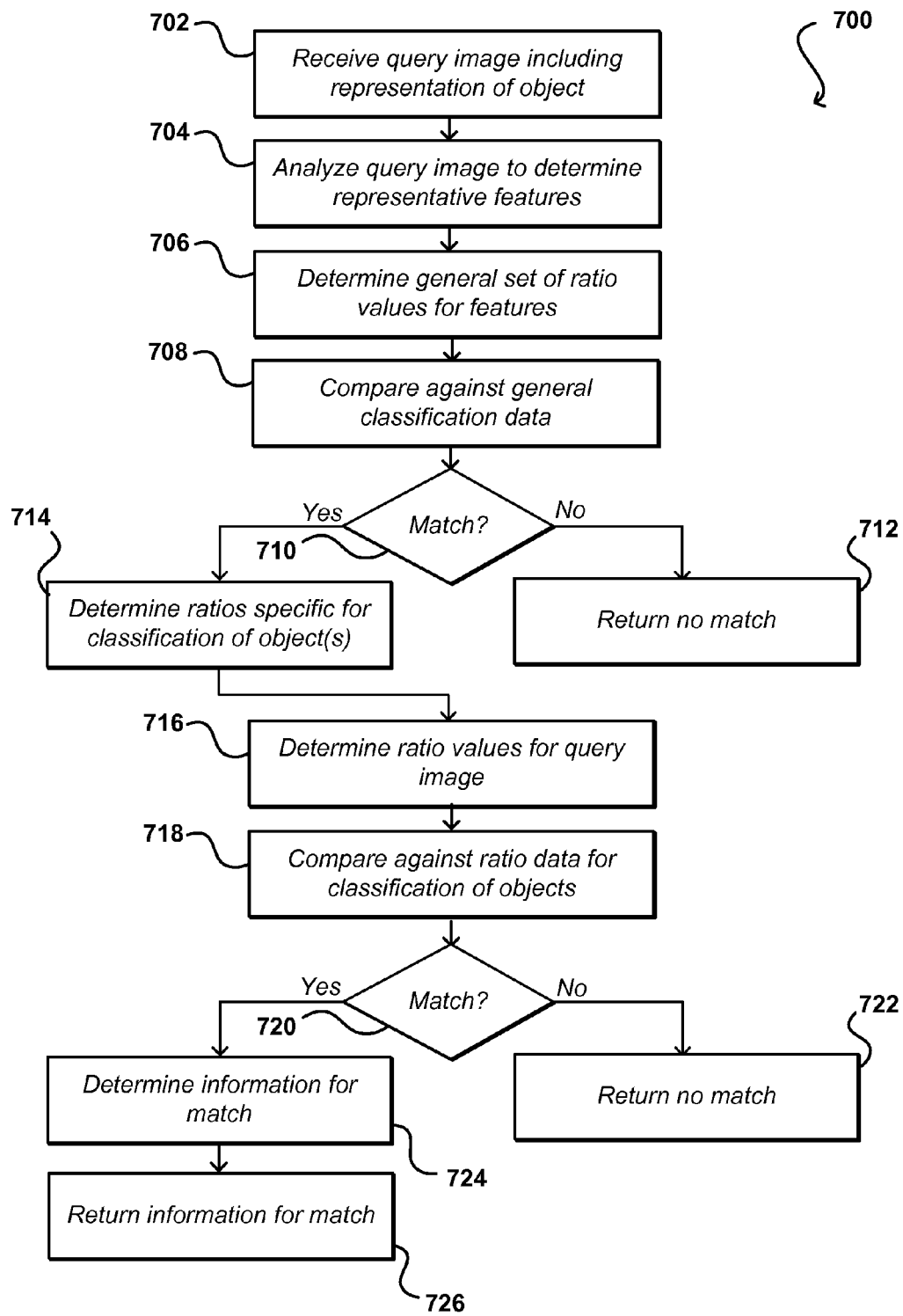
FIG. 7 illustrates a second example process for identifying an object that can be utilized in accordance with various embodiments.

If the number of points is determined to not be adequate, another determination can be made 610 as to whether a scalar element was located in the query image. As discussed above, a scalar element can include any portion of the image, such as a logo, label, or text, that can be useful in identifying an object and establishing a relative scale for that object. The scalar element can be determined using any appropriate process, such as an logo match or optical character recognition (OCR) process, among other such options. If no such scalar element is located, either a "no match" or similar result can be returned, or another approach can be utilized 612, such as that discussed with respect to FIG. 7. If such a scalar element can be located and identified (through image match or other approaches discussed herein), at least one classification of the potential types of object(s) can be determined 614. The classification can include a type of object, a brand of object, one or more categories of objects, and the like. Based at least in part upon the classification, a set of ratios can be determined 616 for use in recognizing the object. These can include, for example, ratios that have been determined to be of most use in identifying or recognizing items in this classification. As mentioned, this can include button-related measurements for shirts and logo-related ratios for computing devices, among other such options. The values for these ratios can be determined 618 for the query image, and compared 620 against ratio data for objects of the classification, such as data for objects previously analyzed using approaches discussed herein. Based at least in part upon the comparison, a determination can be made 622 as to whether a match can be located with at least the minimum confidence or amount of certainty. If not, a "no match" or similar result can be returned 624. If a match can be located, information for the matching object can be determined 626, and returned 628 to the user and/or device that submitted the query image.

In some instances, a scalar element may not be present (or recognized) in an image, or a more general approach otherwise preferred. In such a situation, another example process 700 can be used such as that illustrated in FIG. 7. In this example a query image is received 702 that includes a representation of an object. The query image can be analyzed, such as discussed with respect to the process of FIG. 6, to determine 704 representative features in the query image. As mentioned with respect to FIG. 6, this can include determining the presence of a scalar element in the image. In addition to logos, letters, words, or icons, for example, any type of element that can provide a measure of relative or absolute scale can be utilized as well, as may include true circles, squares, or other elements that may not be unique but that might have characteristics that enable them to be used for adjusting scale, warp, distortion, or other such affects. For example, if a true square appears as a rhombus in an image, a distortion removal process (or image size adjustment, etc.) can be applied to adjust at least some of the distortion present in the image. In this example, a general set of ratio values can be determined 706 using the representative feature points, as well as any determined scalar element. These can be ratios that have been determined to be most useful in classifying objects in a particular category or group of items in at least some embodiments. The ratio values can be compared 708 against ratio values for a set of general classification data in order to determine 710 whether a matching object type can be located. If not, a "no match" or other such result can be returned 712, or other process initiated. If a matching object type (or other classification) can be determined, a second set of ratios specific to that classification of object(s) can be determined 714. Using the ratios of the second set, the values for these ratios can be determined 716 using the query image and the resulting values compared 718 against the ratio data for the classification. Based at least in part upon the comparison, a determination can be made 720 as to whether a match can be located with at least the minimum confidence or amount of certainty. If not, a "no match" or similar result can be returned 722. If a match can be located, information for the matching object can be determined 724, and returned 726 to the user and/or device that submitted the query image.

In order to perform ratio-based identification, the ratio information to be used for matching must be determined ahead of time, or at least at the time of matching. This information can be determined in a number of different ways. For example, in some instances an employee of a content provider or other such entity can perform a manual inspection to determine measurements and ratios that are at least indicative of a specific type of item, such as buttonhole lengths on shirts or logo-to-case size ratios for smartphones. The employee can then provide rules, guidelines, and/or measurements to be used to perform matching based on at least these ratios. In some instances a feature analysis can be performed on a set of images of a certain type in order to determine the measurements and/or ratios that are most indicative of a particular object, type of object, or brand of object. In some embodiments, a feature detection process can be performed and a sampling of ratios performed in order to attempt to generate a signature that is indicative of an object or type of object. Various other approaches can be utilized as well.

In some embodiments the analysis will be performed on a single image or set of images that are provided by a content provider or provider of the type of object. In other embodiments a content provider might capture images of such an object, which enables the provider to determine appropriate angles needed to correctly model an object that might be imaged from various angles. The provider can also capture images from specific viewpoints and/or distances, which can help to infer dimensions and ratios. In still other embodiments a three-dimensional modeling approach can be used in order to attempt to generate a three-dimensional virtual model of the object, from which various measurements and ratios can be calculated based upon point of view and other such aspects. As an example, each notebook computer of a particular brand might have a different height, width, and depth, such that the ratios may also vary by computer and the ratios of interest can depend upon the angle from which the notebook computer is captured. Thus, the ability to have a three-dimensional model can enable multiple input views to be matched based upon a single data set. In some embodiments objects can be scanned using three-dimensional laser scanning systems to generate accurate three-dimensional virtual models. Once a three-dimensional model is available, mining intrinsic features or ratios can be relatively straightforward. Different line- and plane-fitting algorithms can be used to measure lengths and distances for each part or feature of the object. In other embodiments a virtual three-dimensional model can be constructed from a video image sequence. Using structure from motion algorithms, a three-dimensional model of an object can be constructed and then the three-dimensional model mined or analyzed for measurement and ratio data as discussed above.

In some embodiments certain dimensions might be provided along with object data, such as for products offered for sale. A given object might have associated fields of data such as width, height, depth, brand, and object category. There might also be information on the size of the parts of the objects. In some cases, a logo might always be of a specific size on products of a certain type. A number of possible size ratios then can be determined based on these ratios alone, which can be applied as discriminative for product classification. A user searching for a specific brand or in a specific category can help to select the appropriate ratios for matching. Otherwise, a process can attempt to analyze the image to determine such brand or category information, such as by analyzing text, logos, or other such identifiers. A discriminative set of measurements can be generated for all objects represented in an image, at least after an object segmentation process is performed to identify the portion of the image that corresponds to a representation of an object. In some embodiments, a bounding box can be determined for the outer edge of the representation, and then ratios such as the longer bounding box edge to the shorter edge, bounding ellipse area to bounding box area, and bounding ellipse major axis to minor axis can be determined, as well as similar ratios for brand logo on the product, logo to object ratios, and the like.

In some embodiments two sets of measurements can be used, with a first or more general set used to identify a type of object and a second, more specific set of measurements that is specific to that type of object. For example, a general set of measurements or deep learning classifiers might be used with a deep learning classifier to determine that the object represented in a query image is a "bottle." After the object type is determined (first performing any localization needed to extract the ratios, etc., as discussed above), it is possible to extract bottle specific features such as lid-to-bottle height ratio. For example, the ratio of the lid of a one liter bottle of a brand of soda to the height of the bottle itself can drastically narrow down the search space of all products of that brand. If the lid-to-bottle height ratio is small, then the bottle might be a large size. One can also mine other features such as the logo size divided by the height of the label or bottle itself. Such ratios are preserved across different instances of the same product and model. Information such as color consistency can be used as well. For example, specific regions can be compared to determine whether the color is consistent and indicative of a particular type of object. For example, a label color or liquid color might be indicative of a specific type of object, regardless of whether the logo or text is visible in the image. This can be important as a manufacturer might use the same type of bottle for various products, such as cola, grape soda, and ginger ale, each of which can have a different color liquid. Similarly, the diet version of a soft drink might have the same liquid color but a different label color, among other such options. For objects such as furniture, the objects might be identical other than the color of the objects, such that the only way to differentiate between objects of a particular type, brand, and model might be by determining the color of the object in the image.

While using the measurements and ratios to locate matching image data can be relatively straightforward, the process of obtaining accurate measurements and/or ratios can be relatively difficult in at least some situations. For example, ratios and measurements are not preserved across different perspectives. Measurements can be normalized if the exact position and pose of the object is known relative to the camera. While the exact pose of an object in an image will not generally be known, pose estimation can performed in a variety of ways. One way is to use image match techniques to solve for a linear or non-linear motion model of points from the product image to the object in the query image. Another option is to use depth sensors of certain cameras or devices to solve for the pose of the object. Such approaches can provide reasonable results, particularly with known shape categories, like planar objects, bottles, etc. In some embodiments a video capture showing a representation of the object can also be used to infer the pose to select an image from which the perspective distortion is minimal.

Another potential issue with determining accurate measurements and ratios is a result of the limits of the resolution of the image itself. The size measurements on the query images will generally be in pixels. The precision with which measurements can be made is thus dependent at least in part upon the resolution of the query image. If the object is relatively small in the image, or takes up only a small percentage of the image real estate, it can be difficult to accurately determine relatively distances due to the relative size of the pixels in the image. In order to reduce the discretization errors, sub-pixel level interpolation and image alignment techniques can be utilized. Such processes are known in the art for purposes such as image comparison and refinement. The ability to interpolate can help to determine more accurate ratios, as measurements more accurate than the pixel dimensions can be determined. Super resolution algorithms can also be utilized to increase the intrinsic resolution of the image using multiple images of the same scene or object. This can be particularly beneficial when the input image sequence is coming from a video with little to no movement. Other approaches for boosting accuracy can be used as well. These can include, for example, averaging measurements across different images and/or frames in a progressive manner, as well as making use of prior information on popular models or products, such as the prior probability of observing a particular model using Bayesian or other such models. These can be particularly beneficial for situations such as apparel recognition and fine-grained image matching.

In at least some embodiments, query images can also be pre-processed in order to attempt to improve the quality of the match. This can include, for example, using noise reduction algorithms or attempting to adjust a brightness or contrast of the image. In some embodiments a color depth of the image may be reduced and/or quantized in order to attempt to improve the quality of the match with respect to region colors, etc. As mentioned, a super resolution or other such process can also be used in an attempt to increase the precision of the data that can be determined from the image. Processes of a particular precision may be able to provide additional advantages as well, such as to provide information the size of a specific object (i.e., 10 for a shoe or medium for a shirt) based on the determined ratios.

In embodiments where patterns are present, and a given pattern can help to identify an object, it can be desirable to do at least a brief pattern analysis to attempt to prioritize the ratios. For example, a checkered shirt would have certain ratios more important than a shirt with only horizontal stripes. By determining the type of pattern, the ratios to utilize and/or the weight to apply to those ratios can be set accordingly. In some embodiments there can be both generic and unique features, and the weighting of each in the matching process can vary. Similarly, certain ratios may be weighted more than others, as ratios of distances between certain features may be more indicative of a particular object than ratios of distances between generic features, although the generic features may be more useful initially for determining a general categorization of the object.

Figure 8:
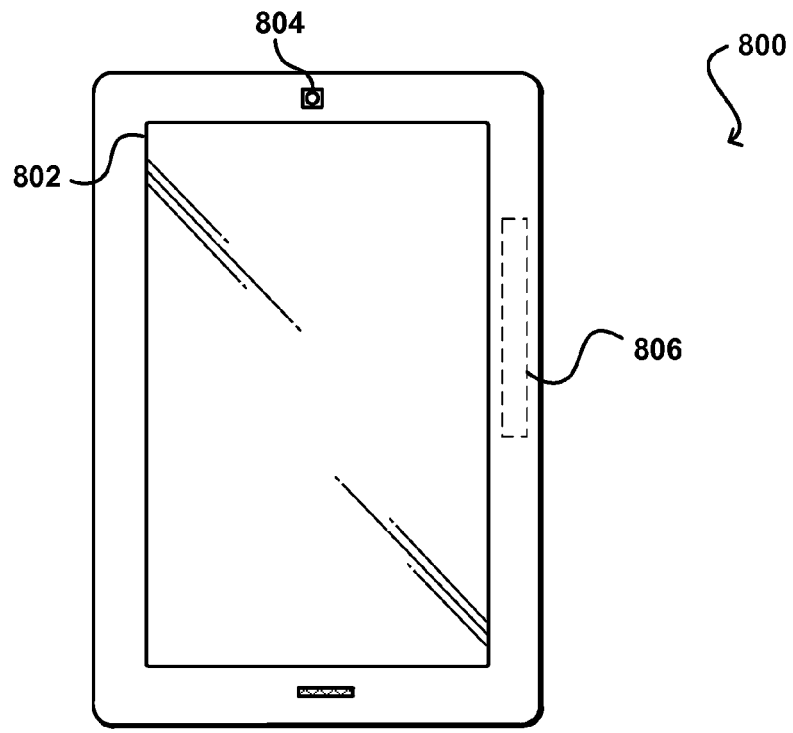
FIG. 8 illustrates an example device that can be used to implement aspects of the various embodiments.

FIG. 8 illustrates an example electronic user device 800 that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, virtual reality helmets or glasses, and portable media players. In this example, the computing device 800 has a display screen 802 on the front side, which under normal operation will display information to a user facing the display screen (e.g., on the same side of the computing device as the display screen). The computing device in this example includes at least one camera 804 or other imaging element for capturing still or video image information over at least a field of view of the at least one camera. In some embodiments, the computing device might only contain one imaging element, and in other embodiments the computing device might contain several imaging elements. Each image capture element may be, for example, a camera, a charge-coupled device (CCD), a motion detection sensor, a depth sensor, or an infrared sensor, among many other possibilities. If there are multiple image capture elements on the computing device, the image capture elements may be of different types. In some embodiments, at least one imaging element can include at least one wide-angle optical element, such as a fish eye lens, that enables the camera to capture images over a wide range of angles, such as 180 degrees or more. Further, each image capture element can comprise a digital still camera, configured to capture subsequent frames in rapid succession, or a video camera able to capture streaming video.

The example computing device 800 also can include at least one orientation sensor 806, such as a position and/or movement-determining element. Such a sensor can include, for example, an accelerometer or gyroscope operable to detect an orientation and/or change in orientation of the computing device, as well as small movements of the device. An orientation sensor also can include an electronic or digital compass, which can indicate a direction (e.g., north or south) in which the device is determined to be pointing (e.g., with respect to a primary axis or other such aspect). An orientation sensor also can include or comprise a global positioning system (GPS) or similar positioning element operable to determine relative coordinates for a position of the computing device, as well as information about relatively large movements of the device. Various embodiments can include one or more such elements in any appropriate combination. As should be understood, the algorithms or mechanisms used for determining relative position, orientation, and/or movement can depend at least in part upon the selection of elements available to the device.

Figure 9:
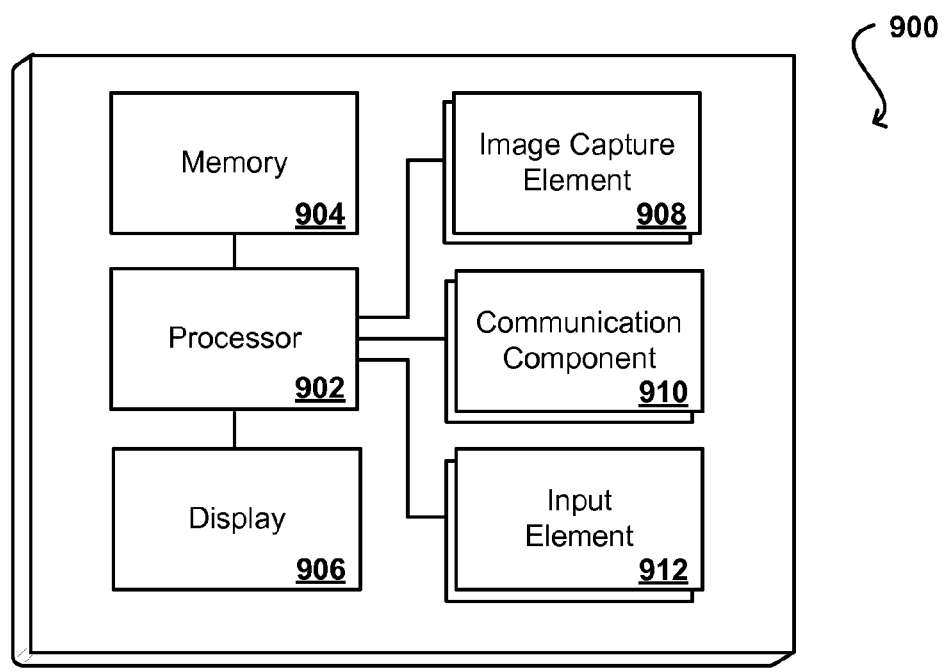
FIG. 9 illustrates example components of a computing device such as that illustrated in FIG. 8.

FIG. 9 illustrates a logical arrangement of a set of general components of an example computing device 900 such as the device 800 described with respect to FIG. 8. In this example, the device includes a processor 902 for executing instructions that can be stored in a memory device or element 904. As would be apparent to one of ordinary skill in the art, the device can include many types of memory, data storage, or non-transitory computer-readable storage media, such as a first data storage for program instructions for execution by the processor 902, a separate storage for images or data, a removable memory for sharing information with other devices, etc. The device typically will include some type of display element 906, such as a touch screen or liquid crystal display (LCD), although devices such as portable media players might convey information via other means, such as through audio speakers. As discussed, the device in many embodiments will include at least one image capture element 908 such as a camera or infrared sensor that is able to image projected images or other objects in the vicinity of the device. Methods for capturing images or video using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device similarly includes at least one audio capture component 912, such as a mono or stereo microphone or microphone array, operable to capture audio information from at least one primary direction. A microphone can be a uni- or omni-directional microphone as known for such devices.

In some embodiments, the computing device 900 of FIG. 9 can include one or more network communication elements 910, such as a Wi-Fi, Bluetooth, RF, wired, or wireless communication system. The device in many embodiments can communicate with a network, such as the Internet, and may be able to communicate with other such devices. In some embodiments the device can include at least one additional input device able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device 900 also can include at least one orientation or motion sensor (not shown). As discussed, such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 902, whereby the device can perform any of a number of actions described or suggested herein.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate non-transitory media known or used in the art, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system, comprising:
   at least one processor; and
   memory including instructions that, when executed by the at least one processor, cause the system to:
   receive an image acquired using a camera of a portable computing device, the image including a representation of an object of interest for a user of the portable computing device;
   analyze at least a portion of the image using at least one feature detection process to identify a set of feature points corresponding to the representation of the object of interest;
   identify, based on a subset of the set of feature points, a scalar element represented in the image, the scalar element corresponding to a visual element associated with one or more types of objects;
   determine, based at least in part upon the scalar element, an object classification for the object of interest;
   determine a set of ratios representative of objects in the object classification;
   analyze distances between pairs of feature points of the set of feature points to determine values for ratios of the set of ratios, at least a subset of the set of ratios including dimensions of the scalar element with respect to dimensions of the object of interest;
   compare the values for the ratios against ratio data stored for objects in the object classification;
   determine a matching object where the values for the ratios correspond to the ratio data for the matching object with at least a minimum confidence; and
   provide information for the matching object to the portable computing device.

2. The system of claim 1, wherein the instructions when executed further cause the system to:
   determine a bank of ratios signature for the representation of the object of interest based at least in part upon a distribution of the values for the ratios, wherein comparing the values for the ratios against the ratio data stored for the objects in the object classification includes comparing the bank of ratios against a bank of ratios for the objects in the object classification.

3. The system of claim 1, wherein the instructions when executed further cause the system to:
   determine respective weightings for at least a subset of the set of ratios, the respective weightings indicating an importance of respective ratio values in distinguishing between object types represented in the determined object classification.

4. The system of claim 1, wherein the instructions when executed further cause the system to:
   determine a color value for a least one region of the representation of the object of interest, the at least one region being determined at least in part by the object classification; and
   determine the matching object based further on the matching object having a similar color value in the corresponding region to the color value for the least one region of the representation of the object of interest.

5. The system of claim 1, wherein the instructions when executed further cause the system:
   determine a relative weighting of at least a subset of the set of ratios based at least in part upon the object classification, the relative weighting for a ratio indicative of an association of the ratio with a distinctive characteristic of one or more objects types represented in the determined object classification.

6. The system of claim 1, wherein the scalar element includes at least one of a logo, a label, a letter, or text corresponding to at least one of a type of object or a family of objects.

7. The system of claim 1, wherein at least a subset of the pairs of feature points of the ratios corresponds to feature points of the scalar element, wherein the scalar element functions as a reference for distance measurements.

8. The system of claim 1, wherein the instructions when executed further cause the system:
   segment the image into an object region and at least one non-object region, wherein the set of feature points correspond to the object region including the representation of the object of interest.

9. The system of claim 1, wherein the instructions when executed to compare the values further cause the system:

compare at least one of a bank of ratios, a ratio signature, an average ratio value, a range of ratios values, a distribution of ratio values, or a histogram of ratio values.

10. The system of claim 1, wherein the instructions when executed further cause the system:
determine a color region in the representation of the object of interest, wherein determining the matching object further includes locating data for an object having a similar color for a corresponding color region.

11. A method, comprising:
receiving an image acquired using a camera of a portable computing device, the image including a representation of an object of interest for a user of the portable computing device;
analyzing at least a portion of the image using at least one feature detection process to identify a set of feature points corresponding to the representation of the object of interest;
identifying, based on a subset of the set of feature points, a scalar element represented in the image, the scalar element corresponding to a visual element associated with one or more types of objects;
determining, based at least in part upon the scalar element, an object classification for the object of interest;
determining a set of ratios representative of objects in the object classification;
analyzing distances between pairs of feature points of the set of feature points to determine values for ratios of the set of ratios, at least a subset of the set of ratios including dimensions of the scalar element with respect to dimensions of the object of interest;
comparing the values for the ratios against ratio data stored for objects in the object classification;
determining a matching object where the values for the ratios correspond to the ratio data for the matching object with at least a minimum confidence; and
providing information for the matching object to the portable computing device.

12. The method of claim 11, comprising:
performing interpolation on at least a portion of the image to increase a precision of the values for the ratios.

13. The method of claim 11, comprising:
determining a bank of ratios signature for the representation of the object of interest based at least in part upon a distribution of the values for the ratios, wherein comparing the values for the ratios against the ratio data stored for the objects in the object classification includes comparing the bank of ratios against a bank of ratios for the objects in the object classification.

14. The method of claim 11, comprising:
determining respective weightings for at least a subset of the set of ratios, the respective weightings indicating an importance of respective ratio values in distinguishing between object types represented in the determined object classification.

15. The method of claim 11, comprising:
determining a color value for a least one region of the representation of the object of interest, the at least one region being determined at least in part by the object classification; and
determining the matching object based further on the matching object having a similar color value in the corresponding region to the color value for the least one region of the representation of the object of interest.

16. A non-transitory computer readable storage medium storing one or more sequences of instructions executable by one or more processors to perform a set of operations comprising:
receiving an image acquired using a camera of a portable computing device, the image including a representation of an object of interest for a user of the portable computing device;
analyzing at least a portion of the image using at least one feature detection process to identify a set of feature points corresponding to the representation of the object of interest;
identifying, based on a subset of the set of feature points, a scalar element represented in the image, the scalar element corresponding to a visual element associated with one or more types of objects;
determining, based at least in part upon the scalar element, an object classification for the object of interest;
determining a set of ratios representative of objects in the object classification;
analyzing distances between pairs of feature points of the set of feature points to determine values for ratios of the set of ratios, at least a subset of the set of ratios including dimensions of the scalar element with respect to dimensions of the object of interest;
comparing the values for the ratios against ratio data stored for objects in the object classification;
determining a matching object where the values for the ratios correspond to the ratio data for the matching object with at least a minimum confidence; and
providing information for the matching object to the portable computing device.

17. The non-transitory computer readable storage medium of claim 16, further comprising instructions executed by the one or more processors to perform the set of operations of:
determining a bank of ratios signature for the representation of the object of interest based at least in part upon a distribution of the values for the ratios, wherein comparing the values for the ratios against the ratio data stored for the objects in the object classification includes comparing the bank of ratios against a bank of ratios for the objects in the object classification.

18. The non-transitory computer readable storage medium of claim 16, further comprising instructions executed by the one or more processors to perform the set of operations of:
determining respective weightings for at least a subset of the set of ratios, the respective weightings indicating an importance of respective ratio values in distinguishing between object types represented in the determined object classification.

19. The non-transitory computer readable storage medium of claim 16, further comprising instructions executed by the one or more processors to perform the set of operations of:
determining a color value for a least one region of the representation of the object of interest, the at least one region being determined at least in part by the object classification; and
determining the matching object based further on the matching object having a similar color value in the corresponding region to the color value for the least one region of the representation of the object of interest.

20. The non-transitory computer readable storage medium of claim 16, further comprising instructions executed by the one or more processors to perform the set of operations of:
determining a color region in the representation of the object of interest, wherein determining the matching object further includes locating data for an object having a similar color for a corresponding color region.

* * * * *